Sept. 28, 1965          D. GABRIEL          3,208,477
FAUCETS WITH SUPPLEMENTAL FOUNTAIN DISCHARGES
Filed April 2, 1963
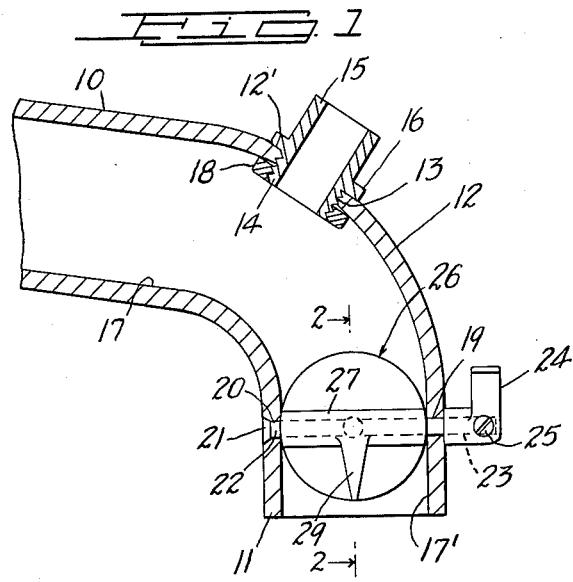
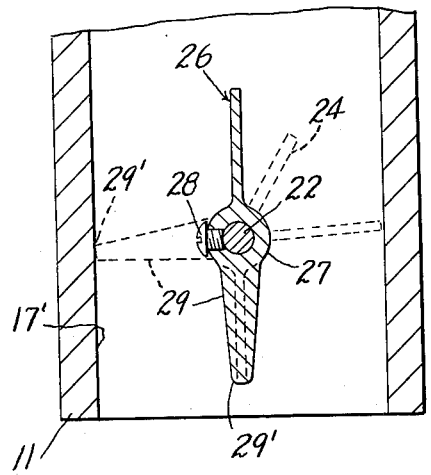
INVENTOR.
DANIEL GABRIEL
BY
*Howard L. Thompson*
ATTORNEY

United States Patent Office 3,208,477
Patented Sept. 28, 1965

3,208,477
FAUCETS WITH SUPPLEMENTAL FOUNTAIN DISCHARGES
Daniel Gabriel, Bonny Blue, Va.
Filed Apr. 2, 1963, Ser. No. 270,022
1 Claim. (Cl. 137—608)

This invention relates to faucets such as used in conjunction with sinks, basins and the like. More particularly, the invention comprises the provision of a supplemental discharge on devices of the type and kind, wherein the device includes a manually actuated valve for controlling and regulating the supplemental discharge in providing on a faucet means for producing a fountain-like discharge used by an operator in obtaining a drink without the necessity of utilizing a receiving receptable of any type or kind.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged diagrammatic sectional view through the discharge end of a faucet and illustrating an adaptation of my invention; and FIG. 2 is an enlarged detail sectional view through the valve portion of the device as seen in FIG. 1, the section being generally on the line 2—2 of FIG. 1.

My invention is adaptable for use in connection with the tubular discharge of any type and kind of faucet construction, whether it be a single faucet or a dual hot and cold water discharge. In FIGS. 1 and 2 of the drawing, 10 represents the tubular nozzle end of any structure of this type and kind which usually employs a downwardly directed discharge end 11, joining the tubular body in a rounded portion 12.

The upper wall of the rounded portion 12 is apertured, as seen at 13, and, in the construction shown, the aperture 13 is threaded to receive the threaded end portion 14 of a fountain discharge tube 15. The tube 15 has an annular flange portion 16 which can be of any desired nut-like contour or, in some instances, could simply be knurled and the flange portion is preferably seated on a flattened surface 12' of the rounded portion 12, as diagrammatically illustrated. In the present construction, the threaded end 14 of the tube 15 projects into the bore 17 of the faucet discharge tube 10 and a lock nut 18 can be mounted on the projected end in securely retaining the fountain tube 12 in position.

The downwardly directed discharge end 11 is fashioned to form opposed apertures 19 and 20, the aperture 20 being preferably countersunk to receive the head 21 of a pin 22 arranged in the apertures 19 and 20 and having a projecting end 23, to which is fixed an operating lever 24, as by a screw 25. Fixed to the pin 22 within the discharge end 17' of the bore 17 is a control valve 26, generally in the form of a disc, having a hub portion 27, in which the pin 22 is mounted, the valve 26 being fixed to the pin 22 by a set screw 28, as clearly noted in FIG. 2 of the drawing. The lower portion of the valve 26, as noted in FIGS. 1 and 2, has, centrally thereof, an enlarged outwardly tapered weighted portion 29, shown in section in FIG. 2, the purpose of which is to normally maintain the valve in the upright position shown in FIGS. 1 and 2 for normal clear passage of water through the discharge end 17' of the bore. It will be noted that the lever 24 is adjustably fixed on 22 so as to normally assume the angular position, indicated in dotted lines in FIG. 2 of the drawing, when the valve 26 is in the open position. However, upon depressing the lever 24, the valve 26 will be rotated to bring the lower weighted end 29 into the position indicated in dotted lines in FIG. 2 of the drawing, in which operation the enlarged end portion 29' of this end will strike the wall of the bore 17' to check rotary movement of the valve 26, so that, in normal functioning of the valve, the same will swing from the full line position slightly less than 90° in establishing closure or substantial closure of the bore 17'. If, inadvertently, the lever 24 should be swung from right to left, rather than downwardly, considering FIG. 2 of the drawing, it will be understood that 29' will accomplish the same check and stop in engaging the opposed wall of the bore 17'. By employing the weighted portion 29 and arrangement of the screw 28 at the side of the valve opposed to the angular extension of the lever 24, the valve will be balanced to maintain the normal inoperative position, as shown in full lines in FIG. 2.

In normal use of the device, discharge of water controlled by the usual valve of a faucet structure will pass downwardly through the bores 17, 17'. Whenever it is desired to provide a fountain discharge through the tube 15, the valve 26 is manually operated and the control of this fountain discharge will be governed by adjustment of the valve 26 with respect to the pressure of flow of water through the bore 17. If this flow should be at high speed or under high pressure, a fountain discharge can be obtained by slight rotary movement of the valve 26; whereas, if the faucet valve is opened only slightly, the valve 26 will have to be moved into a substantially closed position in order to provide the fountain discharge through the tube 15.

Devices of the type and kind under consideration can be utilized in a practical manner in the operation of brushing teeth when it is desirable to rinse the mouth after the tooth brushing operation has been completed and to avoid the necessity of having to use a glass or tumbler for this purpose. In this manner, a greater degree of sanitation will prevail and further obviate the necessity of continuously maintaining the service glass or tumbler in a clean or sanitary condition. It will, further, be apparent that devices of the kind under consideration will enable anyone in a household to obtain a drink from time to time, utilizing the fountain discharge and obviating the necessity of using a glass or tumbler and, thus, further extend the sanitation factors, as well as obviating the necessity of continuously cleaning glasses or tumblers normally used for this purpose.

It will be apparent that, in the present disclosure, I have illustrated the method of procedure which would be followed in converting faucets now in use to provide the fountain discharges thereon; whereas, in the manufacture of new devices, it will be apparent that the tubular fountain discharge can be formed as an integral part of the faucet structure. It will further be understood that my invention is not limited to any particular manner of forming and attaching the fountain discharge with the faucet.

Having fully described my invention, what I claim as new and desire to secure by Letters Patent is:

In faucets employing a rounded tubular nozzle portion having a downwardly directed discharge end, a tubular fountain discharge mounted in the rounded part of the nozzle portion and opening directly into said nozzle portion and projecting outwardly therefrom at an upwardly inclined angle, a pivot pin mounted in the lower portion of said discharge end, said pin having a projecting end, a disc valve fixed to said pin within said discharge end, the disc having tapered weighted means extending radially from the pin for maintaining a lower portion of the disc normally in perpendicular position, and a manually actuated lever adjustably fixed to the projecting end of said pivot pin for movement of the valve disc into position controlling operation of said fountain discharge.

References Cited by the Examiner

UNITED STATES PATENTS

| | | | |
|---|---|---|---|
| 671,671 | 4/01 | Horsley | 251—155 |
| 868,182 | 10/07 | Hayden | 251—305 X |
| 1,556,979 | 10/25 | Uschman | 137—608 |
| 1,993,069 | 3/35 | McConnell | 137—519 |
| 2,524,956 | 10/50 | Brunetti | 137—610 X |
| 2,751,186 | 6/56 | Glur | 251—305 X |
| 3,026,893 | 3/62 | McCarthy | 137—527.8 X |
| 3,101,174 | 8/63 | Loveland | 239—27 |
| 3,107,082 | 10/63 | Reynolds | 137—608 X |

M. CARY NELSON, *Primary Examiner.*

LAVERNE D. GEIGER, *Examiner.*